United States Patent
Fujii

(10) Patent No.: US 7,372,234 B2
(45) Date of Patent: *May 13, 2008

(54) CHARGE CONTROL DEVICE AND BATTERY PACK EMPLOYING IT

(75) Inventor: Masaaki Fujii, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 290 days.

This patent is subject to a terminal disclaimer.

(21) Appl. No.: 11/092,977

(22) Filed: Mar. 30, 2005

(65) Prior Publication Data

US 2005/0218865 A1    Oct. 6, 2005

Related U.S. Application Data

(63) Continuation-in-part of application No. 10/316,152, filed on Dec. 11, 2002, now Pat. No. 6,894,458.

(30) Foreign Application Priority Data

Dec. 11, 2001    (JP) ............... 2001-376771

(51) Int. Cl.
*H02J 7/00*    (2006.01)
(52) U.S. Cl. ...................... 320/106; 320/112
(58) Field of Classification Search ............. 320/120
See application file for complete search history.

(56) References Cited

U.S. PATENT DOCUMENTS 5,557,189 A    9/1996    Suzuki et al.
5,672,953 A *    9/1997    Kim ........................... 320/163
5,905,362 A *    5/1999    Nagano et al. ............. 320/125
6,066,939 A *    5/2000    Nagai et al. ................ 320/128
6,225,783 B1*    5/2001    Nagano et al. ............. 320/128
6,275,006 B1*    8/2001    Koike et al. ................ 320/125

FOREIGN PATENT DOCUMENTS

| JP | 06-205541 | 7/1994 |
| JP | 08-138749 | 5/1996 |
| JP | 2000-123886 | 4/2000 |
| JP | 3080655 | 6/2000 |
| WO | WO 97/13189 | 4/1997 |

* cited by examiner

*Primary Examiner*—Akm Ullah
*Assistant Examiner*—Emily P Pham
(74) *Attorney, Agent, or Firm*—Morgan, Lewis & Bockius LLP

(57) ABSTRACT

A battery pack employing a charge control device of the present invention includes a charge detection circuit for checking whether a secondary cell is in a charged state or not based on at least a charge voltage or a charge current of the secondary cell, a control circuit for controlling feeding of electric power to the secondary cell according to an output of the charge detection circuit, and a setting circuit for setting a level of the charge voltage or the charge current at which the charge detection circuit recognizes the charged state according to control information fed in directly from outside.

5 Claims, 6 Drawing Sheets

CHARGE CONTROL DEVICE AND BATTERY PACK EMPLOYING IT

This application is a Continuation-In-Part of U.S. patent application Ser. No. 10/316,152 filed on Dec. 11, 2002, now U.S. Pat. No. 6,894,458 and claims the benefit of the Japanese patent Application No. 2001-376771, filed in Japan on Dec. 11, 2001, both of which are hereby incorporated by reference in their entirety.

BACKGROUND OF THE INVENTION

1. Field of the Invention

The present invention relates to a charge control device for controlling the charging of a secondary cell or battery (hereinafter collectively referred to as a "secondary cell" throughout the specification and the claims) by monitoring its charge state, and relates also to a battery pack employing such a charge control device.

2. Background or the Related Art

FIG. 6 is a diagram showing circuit configuration of a related art battery pack incorporating a charge control device. The battery pack 1' shown in this figure is composed of a rechargeable secondary cell 2', a charge control IC 3' for controlling the charging of the secondary cell 2' by monitoring its charge state, feed terminals 4a' and 4b' to which direct-current electric power is fed from a charger (not shown), a switch device 5' connected between the feed terminal 4a' and the positive electrode of the secondary cell 2', and a sense resistor 6' connected between the negative electrode of the secondary cell 2' and the feed terminal 4b' (ground line). The sense resistor 6' has a very low resistance (generally a few tens of mΩ), which permits the charge current flowing through the secondary cell 2' to be detected as a voltage.

The charge control IC 3' is built by sealing into a single package a first full charge detection circuit 31' for checking whether the secondary cell 2' is in the fully charged state or not by comparing its charge voltage with a predetermined reference voltage, a direct-current voltage source 32' for generating the reference voltage, a second full charge detection circuit 34' for checking whether the secondary cell 2' is in the fully charged state or not by comparing the voltages at both ends of the sense resistor 6', and a control circuit 35' for controlling the feeding of electric power to the secondary cell 2' by turning on and off the switch device 5' according to the output signals of the first and second full charge detection circuits 31' and 34'.

As described above, the charge control IC 3' can monitor the charge state of the secondary cell 2' and control its charging in a considerably satisfactory manner in this battery pack 1'.

However, in the charge control IC 3' configured as described above, the reference voltage generated by the direct-current voltage source 32' (i.e., the level of the charge voltage at which the first full charge detection circuit 31' recognizes the fully charged state) is fixed at the time of circuit fabrication. This makes it impossible to cancel factors that cause variations in the reference voltage after the circuit fabrication (for example, the influence of stress occurring when the charge control IC 3' is packaged or mounted on a circuit board) and fabrication-associated variations in the secondary cell 2' itself, which is the target of monitoring by the charge control IC 3'. Thus, in the charge control IC 3' configured as described above, the fully charged state voltage level needs to be set rather low to ensure safe charging operation. This makes it impossible to make the most use of the charge capacity of the secondary cell 2'.

On the other hand, the second full charge detection circuit 34' is so configured to check whether the secondary cell 2' is in the fully charged state or not by comparing the voltages at both ends of the sense resistor 6', which is connected external to the charge control IC 3'. Therefore, by setting the resistance of the sense resistor 6' appropriately, it is possible to vary the level of the charge current at which to recognize the fully charged state. However, since the sense resistor 6' has a very low resistance, it tends to be influenced by variations in connection, wiring resistances, and other factors. Accordingly, this makes it extremely difficult to correct a variation in the voltage level at which the fully charged state is recognized. Thus, in the charge control IC 3' configured as described above, the level of the charge current at which the fully charged state is recognized also needs to be set rather low to ensure safe charging operation. And, this makes it impossible to make the most use of the charge capacity of the secondary cell 2'. Moreover, the sense resistor 6', connected externally, hampers the scaling-down and cost reduction of the battery pack 1'.

SUMMARY OF THE INVENTION

Accordingly, the present invention is directed to a charge control device and battery pack employing it that substantially obviates one or more of the problems due to limitations and disadvantages of the related art.

An object of the present invention is to provide a charge control device that can accurately control the charging of a secondary cell by canceling the influence of stress occurring when an IC is packaged or mounted on a circuit board and other factors, and to provide a battery pack employing such a charge control device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the charge control device and battery pack employing it includes a charge control device having a charge detection circuit for checking whether a secondary cell is in a charged state or not based on at least a charge voltage or a charge current of the secondary cell; a control circuit for controlling feeding of electric power to the secondary cell according to an output of the charge detection circuit; and a setting circuit for setting a level of the charge voltage or the charge current at which the charge detection circuit recognizes the charged state according to control information fed in directly from outside.

In another aspect, a battery pack employing a charge control device includes a charge detection circuit for checking whether a secondary cell is in a charged state or not based on at least a charge voltage or a charge current of the secondary cell, a control circuit for controlling feeding of electric power to the secondary cell according to an output of the charge detection circuit, a control information generation circuit for generating control information based on an external signal fed in directly from outside, and a setting circuit for setting a level of the charge voltage or the charge current at which the charge detection circuit recognizes the charged state according to the control information outputted from the control information generation circuit.

In another aspect, a battery pack employing a charge control device includes a charge detection circuit for checking whether a secondary cell is in a charged state or not based on at least a charge voltage or a charge current of the secondary cell; a control circuit for controlling feeding of electric power to the secondary cell according to an output of the charge detection circuit; a control information generation circuit for generating control information by converting an analog external signal fed in directly from outside into digital data; and a setting circuit for setting a level of the charge voltage or the charge current at which the charge detection circuit recognizes the charged state according to the control information outputted from the control information generation circuit.

In another aspect, a battery pack employing a charge control device includes a charge detection circuit for checking whether a secondary cell is in a charged state or not based on at least a charge voltage or a charge current of the secondary cell; a control circuit for controlling feeding of electric power to the secondary cell according to an output of the charge detection circuit; a control information generation circuit for generating control information based on an output result of the control circuit; and a setting circuit for setting a level of the charge voltage or the charge current at which the charge detection circuit recognizes the charged state according to the control information outputted from the control information generation circuit.

In another aspect, a battery pack employing a charge control device includes a charge detection circuit for checking whether a secondary cell is in a charged state or not based on at least a charge voltage or a charge current of the secondary cell; a control circuit for controlling feeding of electric power to the secondary cell according to an output of the charge detection circuit; a detection circuit, provided within the charge control device, for detecting a state of the charge control device; a control information generation circuit for generating control information based on a signal outputted from the detection circuit; and a setting circuit for setting a level of the charge voltage or the charge current at which the charge detection circuit recognizes the charged state according to the control information outputted from the control information generation circuit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
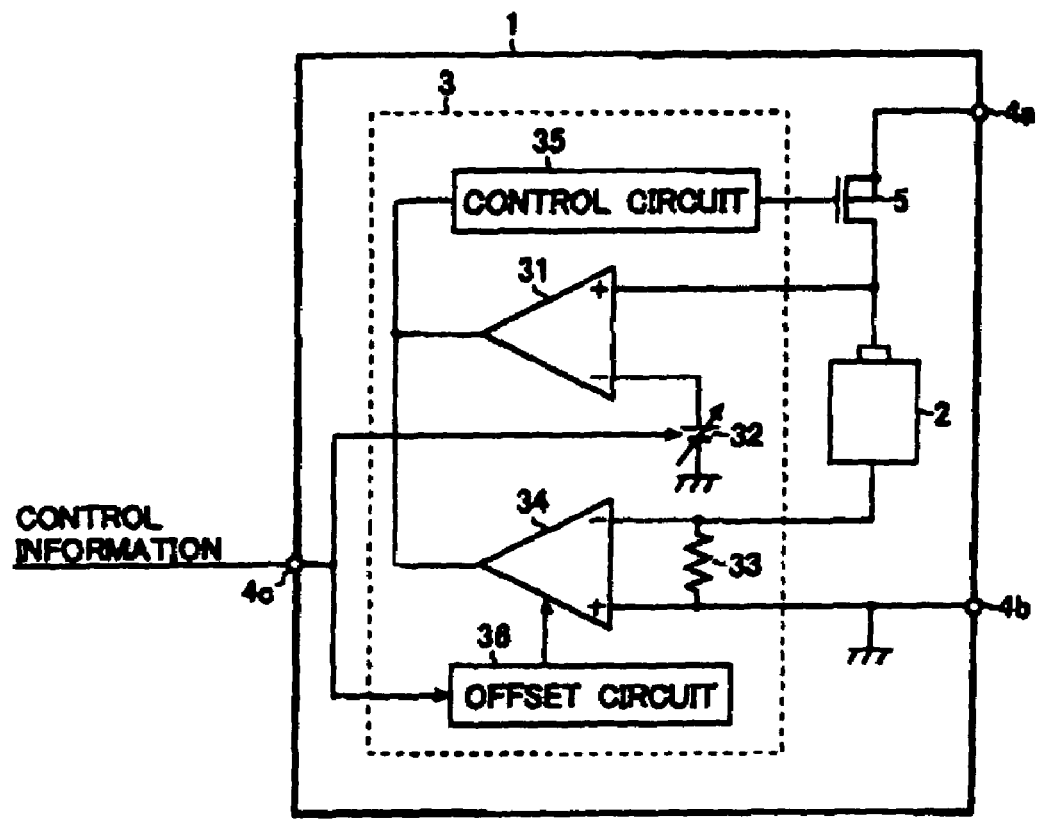
FIG. 1 illustrates a battery pack incorporated with a charge control device of a first exemplary embodiment of the present invention.

FIG. 1 is a circuit configuration of a battery pack incorporating a charge control device of a first exemplary embodiment of the present invention. The battery pack 1 of the first exemplary embodiment is composed of a rechargeable secondary cell 2 (for example, a lithium ion cell), a charge control IC 3 for controlling the charging of the secondary cell 2 by monitoring its charge state, feed terminals 4a and 4b to which direct-current electric power is fed from a charger (not shown), and a switch device 5 (for example, a MOS transistor) connected between the feed terminal 4a and the positive electrode of the secondary cell 2.

The charge control IC 3 is built by sealing into a single package a first full charge detection circuit 31 for checking whether the secondary cell 2 is in the fully charged state or not by comparing its charge voltage with a predetermined reference voltage, a variable direct-current voltage source 32 for generating the reference voltage, a sense resistor 33 connected between the negative electrode of the secondary cell 2 and the feed terminal 4b (ground line), a second full charge detection circuit 34 for checking whether the secondary cell 2 is in the fully charged state or not by comparing the voltages at both ends of the sense resistor 33, a control circuit 35 for controlling the feeding of electric power to the secondary cell 2 by turning on and off the switch device 5 according to the output signals of the first and second full charge detection circuits 31 and 34, an offset circuit 36 for offsetting the level at which the second full charge detection circuit 34 inverts its output, and the feed terminal 4c feeding the control information steadily from outside the charge control device to the variable direct-current voltage source 32 and the offset circuit 36.

The output signal level of the first full charge detection circuit 31 is low (at the logical low level) or high (at the logical high level) according to whether the charge voltage of the secondary cell 2 is lower or higher, respectively, than the reference voltage generated by the variable direct-current voltage source 32. On the other hand, the output signal level of the second full charge detection circuit 34 is low or high according to whether the voltage across the sense resistor 33 is higher or lower, respectively, than the offset level set by the offset circuit 36.

When one of the output signal levels of the first and second full charge detection circuits 31 and 34 becomes high, the control circuit 35 recognizes that at least one of the charge voltage and charge current of the secondary cell 2 indicates the fully charged state, and opens the switch device 5. With this configuration, it is possible to prevent the secondary cell 2 from being overcharged.

Here, the variable direct-current voltage source 32 of the first exemplary embodiment can set the aforementioned reference voltage (i.e., the level of the charge voltage at which the first full charge detection circuit 31 recognizes the fully charged state) according to the control information read from outside the charge control device through the feed terminal 4c. Moreover, the offset circuit 36 of this embodiment can set the aforementioned offset level (i.e., the level of the charge current at which the second full charge detection circuit 34 recognizes the fully charged state) likewise according to the control information read from outside the charge control device through the feed terminal 4c.

With the above described configuration, the charge control IC 3 of the first exemplary embodiment of the present invention can easily change the set levels of the charge voltage and charge current at which the fully charged state is recognized, even after the charge control IC 3 is packaged or mounted on a circuit board, or after the secondary cell 2 is connected.

Accordingly, even after the charge control IC 3 is built into the battery pack 1, it is possible to optimize the levels of the charge voltage and charge current at which to recognize the fully charged state by canceling all factors that cause variations in the reference voltage after the fabrication of the circuit (for example, the influence of stress occurring when the charge control IC 3 is packaged or mounted on a circuit board) and all fabrication-associated variations in the secondary cell 2 itself, which is the very target of monitoring by the charge control IC 3.

Figure 6:
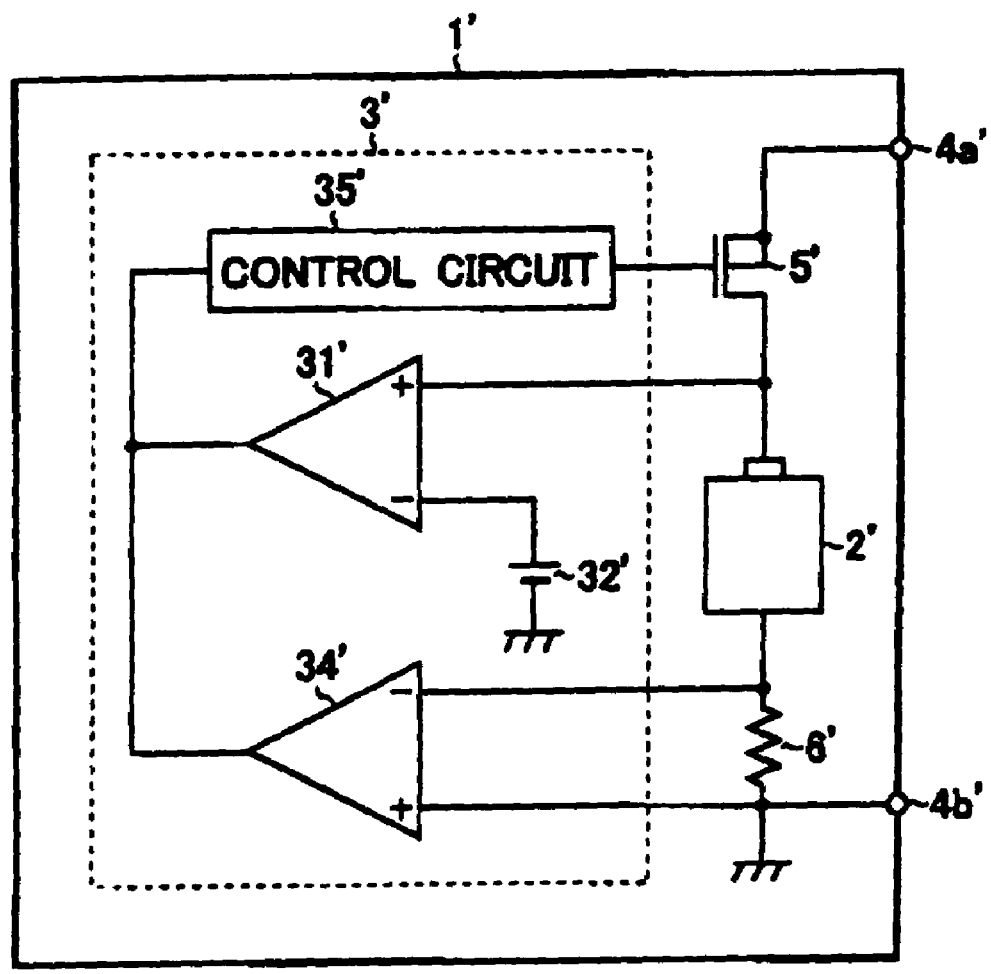
FIG. 6 illustrates a battery pack incorporating a related art charge control device.

In the related art charge control IC 3' (FIG. 6), the fully charged state levels are set rather low to ensure safe charting operation, because approximately ±0.5% variations are inevitable in the charge voltage detected level and charge current detected level. However, in the preferred embodiments of the present invention, when detected levels are reduced to ±0.1% or smaller, it is not necessary to lower the levels of the fully charged state of both circuits 31 and 34. This makes possible to use of the charge capacity of the secondary cell 2 more effectively.

Figure 2:
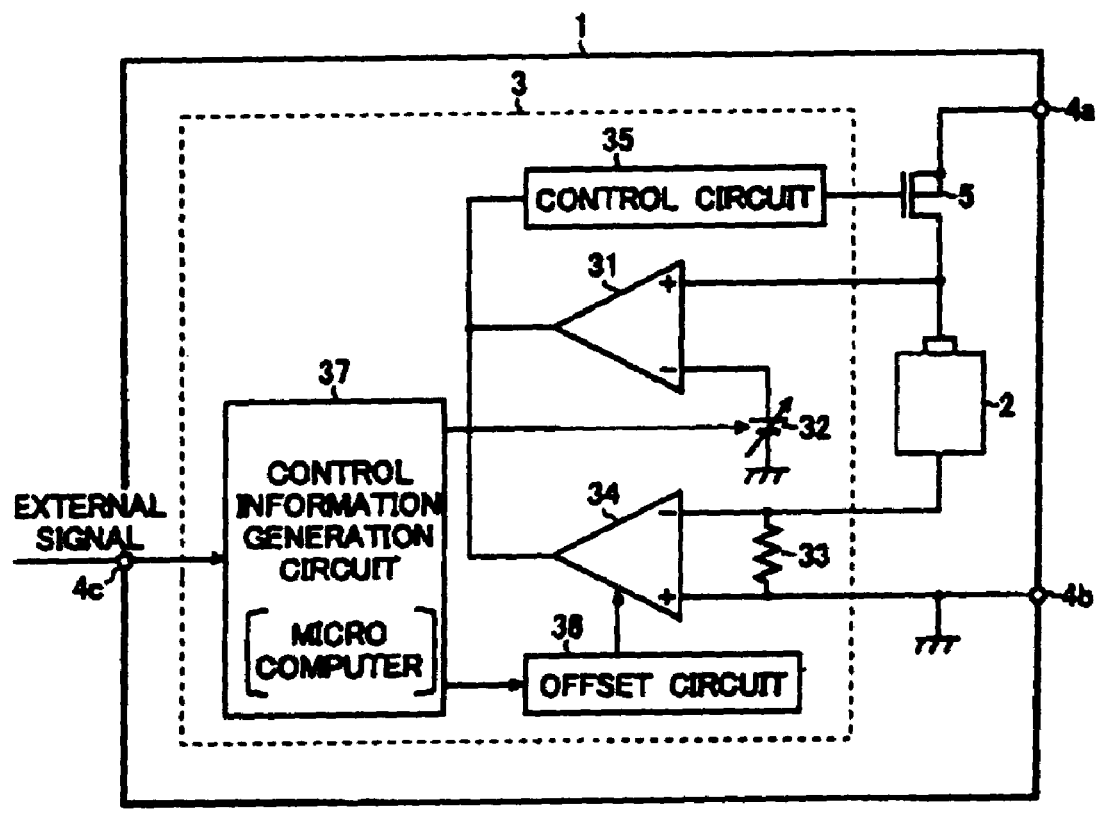
FIG. 2 illustrates a battery pack incorporated with a charge control device of a second exemplary embodiment of the present invention.

FIG. 2 is a circuit configuration of a battery pack incorporating a charge control device of a second exemplary embodiment of the present invention. The numbers appearing in FIG. 2, which are identical to those of FIG. 1, correspond to the same circuit elements as described in reference to the first exemplary embodiment of the present invention. Accordingly, written descriptions for identical circuit elements in FIG. 2 are omitted.

As shown in FIG. 2, a control information generation circuit 37 receives an external signal from outside through the feed terminal 4c, and the control information generation circuit 37 feeds the control information to the variable direct-current voltage source 32 and the offset circuit 36. In the second exemplary embodiment of the present invention, the external signal fed from outside to the control information generation circuit 37 includes a history signal (i.e., a history signal indicating the number of times that the cell has been charged thus far). The control information generation circuit may include a microcomputer.

Figure 3:
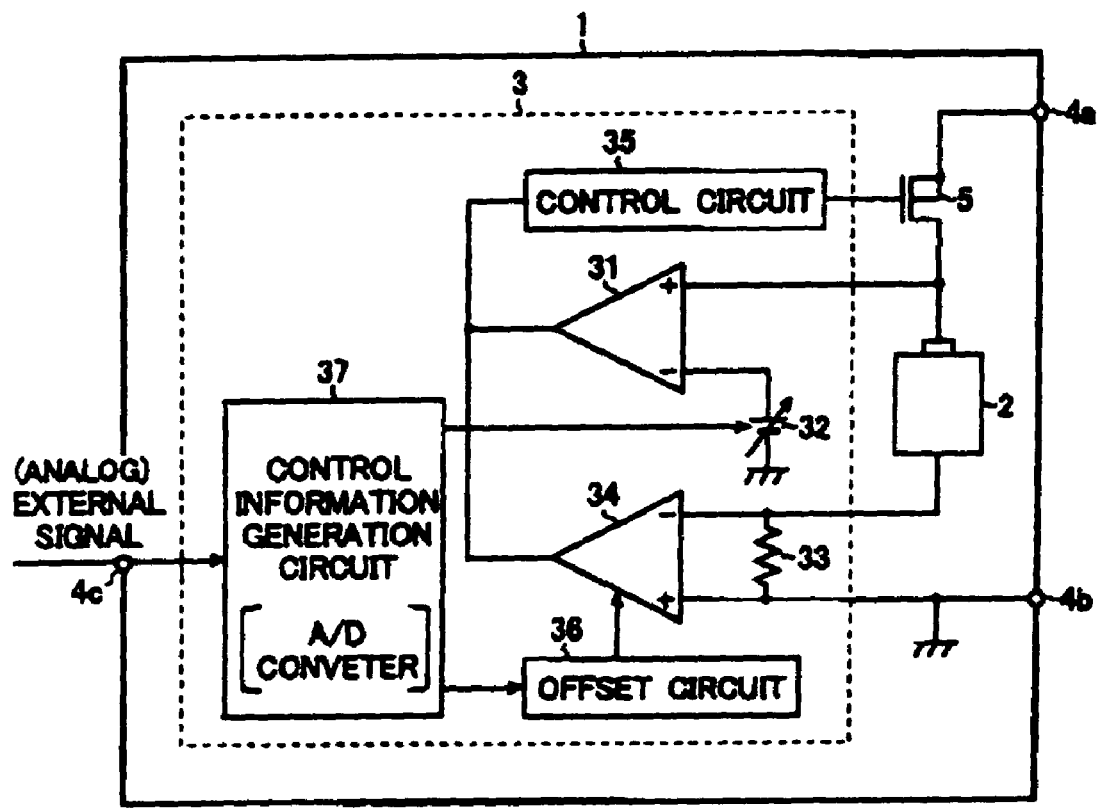
FIG. 3 illustrates a battery pack incorporated with a charge control device of a third exemplary embodiment of the present invention.

FIG. 3 is a circuit configuration of a battery pack incorporating a charge control device of a third exemplary embodiment of the present invention. The numbers appearing in FIG. 3, which are identical to those of FIG. 1, correspond to the same circuit elements as described in reference to the first exemplary embodiment of the present invention. Accordingly, written descriptions for identical circuit elements in FIG. 3 are omitted.

As shown in FIG. 3, a control information generation circuit 37 receives an external signal from outside through the feed terminal 4c, and the control information generation circuit 37 feeds the control information to the variable direct-current voltage source 32 and the offset circuit 36. In the third exemplary embodiment of the present invention, the external signal fed from outside to the control information generation circuit 37 includes an analog signal (i.e., a temperature signal indicating the ambient temperature). The control information generation circuit may include an A/D conversion circuit that converts the analog external signal into a digital signal.

Figure 4:
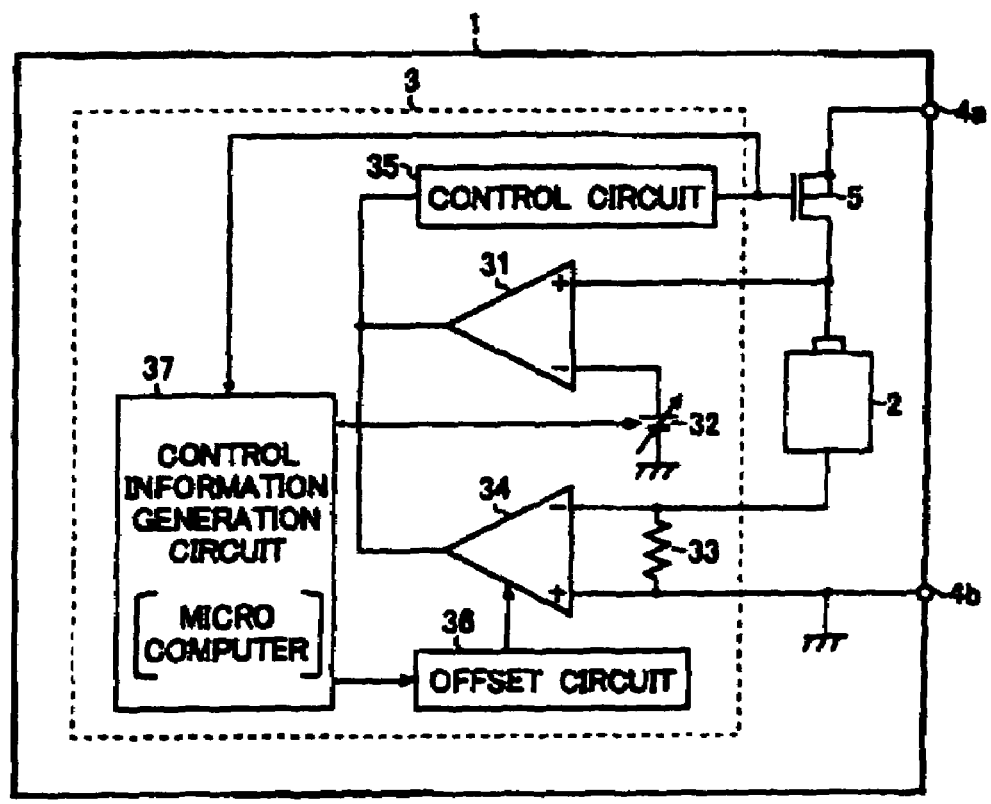
FIG. 4 illustrates a battery pack incorporated with a charge control device of a fourth exemplary embodiment of the present invention.

FIG. 4 is a circuit configuration of a battery pack incorporating a charge control device of a fourth exemplary embodiment of the present invention. The numbers appearing in FIG. 4, which are identical to those of FIG. 1, correspond to the same circuit elements as described in reference to the first exemplary embodiment of the present invention. Accordingly, written descriptions for identical circuit elements in FIG. 4 are omitted.

As shown in FIG. 4, a control information generation circuit 37 receives a feedback signal from the control circuit 35, and the control information generation circuit 37 feeds the control information to the variable direct-current voltage source 32 and the offset circuit 36. In the fourth exemplary embodiment of the present invention, the control information generation circuit may include a microcomputer.

Figure 5:
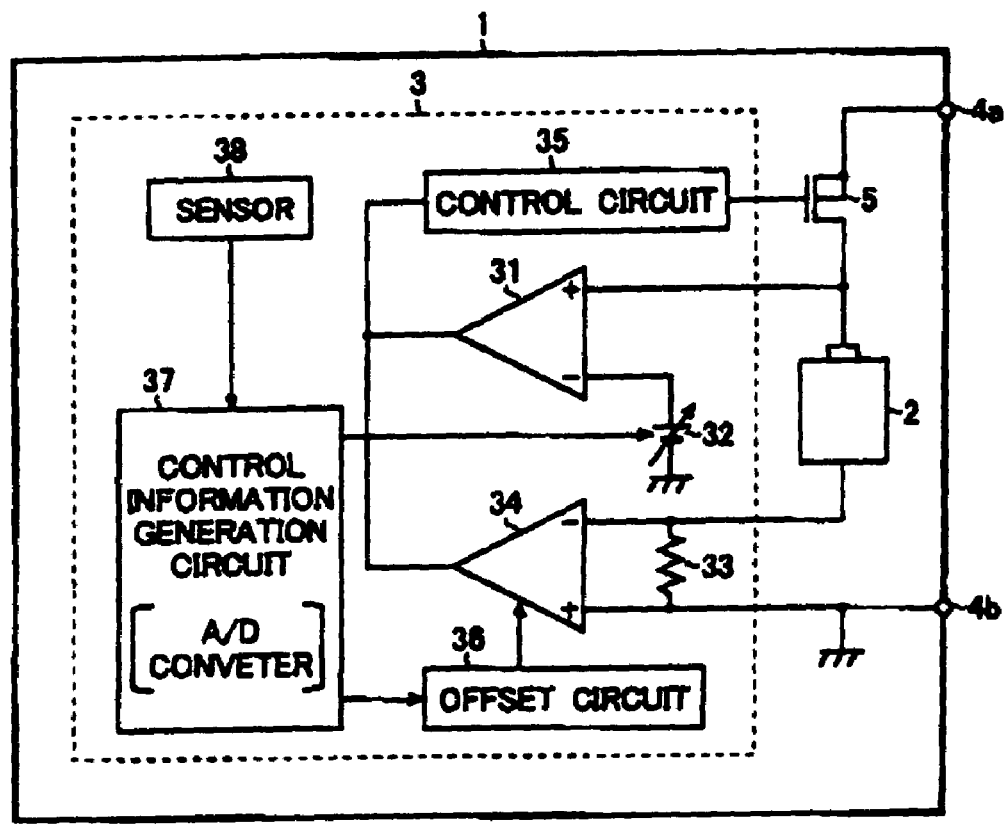
FIG. 5 illustrates a battery pack incorporated with a charge control device of a fifth exemplary embodiment of the present invention.

FIG. 5 is a circuit configuration of a battery pack incorporating a charge control device of a fifth exemplary embodiment of the present invention. The numbers appearing in FIG. 5, which are identical to those of FIG. 1, correspond to the same circuit elements as described above in reference to the first exemplary embodiment of the present invention. Accordingly, written descriptions for identical circuit elements in FIG. 5 are omitted.

As shown in FIG. 5, a control information generation circuit 37 receives a signal from a detection circuit 38 provided within an LSI, and the control information generation circuit 37 feeds the control information to the variable direct-current voltage source 32 and the offset circuit 36. In the fifth exemplary embodiment of the present invention, a plurality of detection circuits may be provided in the LSI, and one of the plurality of detection circuits 38 include a temperature detection circuit. In addition, the control information generation circuit 37 may include an A/D conversion circuit that converts the analog signal (i.e., temperature) into a digital signal.

As discussed in the preferred embodiments of the present invention, the variable direct-current voltage source 32 of each of the preferred embodiment can set the reference voltage (i.e., level of the charge voltage at which the first full charge detection circuit 31 recognizes the fully charged state) according to the control information received. In addition, the offset circuit 36 of each of the preferred embodiments can set the offset level (i.e., level of the charge current at which the second full charge detection circuit 34 recognizes the fully charged state) likewise according to the control information received.

Moreover, adopting the charge control IC 3 of the preferred embodiments eliminate the need to connect a sense resistor externally outside the charge control device for detecting the charge current of the secondary cell 2. This helps realize the scaling-down and cost reduction of the battery pack 1. In addition, switch device 5 may be formed within the charge control IC 3.

Accordingly, the charge control device of the preferred embodiments can accurately control the charging of a secondary cell by canceling the influence of stress occurring when an IC is packaged or mounted on a circuit board and other factors.

It will be apparent to those skilled in art that various modifications and variations can be made in the charge control device and battery pack employing it of the present invention without departing from the spirit or scope of the invention. Thus, it is intended that the present invention cover the modifications and variations of this invention provided they come within the scope of the appended claims and their equivalents.

What is claimed is:

1. A battery pack employing a charge control device, comprising:
   a charge detection circuit for checking whether a secondary cell is in a charged state or not based on at least a charge voltage or a charge current of the secondary cell;
   a control circuit for controlling feeding of electric power to the secondary cell according to an output of the charge detection circuit; and
   a setting circuit for setting a level of the charge voltage or the charge current at which the charge detection circuit recognizes the charged state according to control information fed in directly from outside.

2. A battery pack employing a charge control device, comprising:
   a charge detection circuit for checking whether a secondary cell is in a charged state or not based on at least a charge voltage or a charge current of the secondary cell,
   a control circuit for controlling feeding of electric power to the secondary cell according to an output of the charge detection circuit;
   a control information generation circuit for generating control information based on an external signal fed in directly from outside; and
   a setting circuit for setting a level of the charge voltage or the charge current at which the charge detection circuit recognizes the charged state according to the control information outputted from the control information generation circuit.

3. A battery pack employing a charge control device, comprising: a charge detection circuit for checking whether a secondary cell is in a charged state or not based on at least a charge voltage or a charge current of the secondary cell;
   a control circuit for controlling feeding of electric power to the secondary cell according to an output of the charge detection circuit;
   a control information generation circuit for generating control information by converting an analog external signal fed in directly from outside into digital data; and
   a setting circuit for setting a level of the charge voltage or the charge current at which the charge detection circuit recognizes the charged state according to the control information outputted from the control information generation circuit.

4. A battery pack employing a charge control device, comprising:
   a charge detection circuit for checking whether a secondary cell is in a charged state or not based on at least a charge voltage or a charge current of the secondary cell;
   a control circuit for controlling feeding of electric power to the secondary cell according to an output of the charge detection circuit;
   a control information generation circuit for generating control information based on an output result of the control circuit; and
   a setting circuit for setting a level of the charge voltage or the charge current at which the charge detection circuit recognizes the charged state according to the control information outputted from the control information generation circuit.

5. A battery pack employing a charge control device, comprising: a charge detection circuit for checking whether a secondary cell is in a charged state or not based on at least a charge voltage or a charge current of the secondary cell;
   a control circuit for controlling feeding of electric power to the secondary cell according to an output of the charge detection circuit;
   a detection circuit, provided within the charge control device, for detecting a state of the charge control device;
   a control information generation circuit for generating control information based on a signal outputted from the detection circuit; and
   a setting circuit for setting a level of the charge voltage or the charge current at which the charge detection circuit recognizes the charged state according to the control information outputted from the control information generation circuit.

* * * * *